United States Patent
Zuckerman

[15] 3,701,241
[45] Oct. 31, 1972

[54] METHOD OF PRODUCING AND HARVESTING WHITE ASPARAGUS SPEARS

[72] Inventor: John S. Zuckerman, 1515 West Weber Avenue, Stockton, Calif. 95202

[22] Filed: Aug. 30, 1971

[21] Appl. No.: 175,875

[52] U.S. Cl. ................... 56/327 A, 47/26, 56/DIG. 2
[51] Int. Cl. .............................................. A01d 45/00
[58] Field of Search ...56/DIG. 2, 327 A, 328 R, 330, 56/1; 47/26

[56] References Cited

UNITED STATES PATENTS 3,507,101  4/1970  Bernshausen............56/DIG. 2
3,623,309  11/1971  Stang et al. ..................56/330

*Primary Examiner*—Louis G. Mancene
*Assistant Examiner*—J. N. Eskovitz
*Attorney*—Percy S. Webster et al.

[57] ABSTRACT

A method of producing and harvesting white asparagus spears along a ridged crop row wherein the asparagus plants are growing, and from which row the asparagus spears emerge and thereabove grow to harvest maturity; the method including essentially the step of shielding the crop row against access of sunlight to said emerging and growing spears whereby, in darkness, they remain white.

It is anticipated that the crop row will be shielded, for the above purpose, by a longitudinally extending shroud of opaque material, with the shroud formed so that it may be progressively elevated above the crop row to permit of ready and convenient access to and harvesting of the white spears in the zone in which the shroud is so elevated; such progressive elevation of the shroud, and harvesting of the white spears, being preferably accomplished by a machine designed for such purposes.

9 Claims, 8 Drawing Figures

PATENTED OCT 31 1972 3,701,241

INVENTOR.
John S. Zuckerman
BY
Webster & Webster
ATTORNEYS

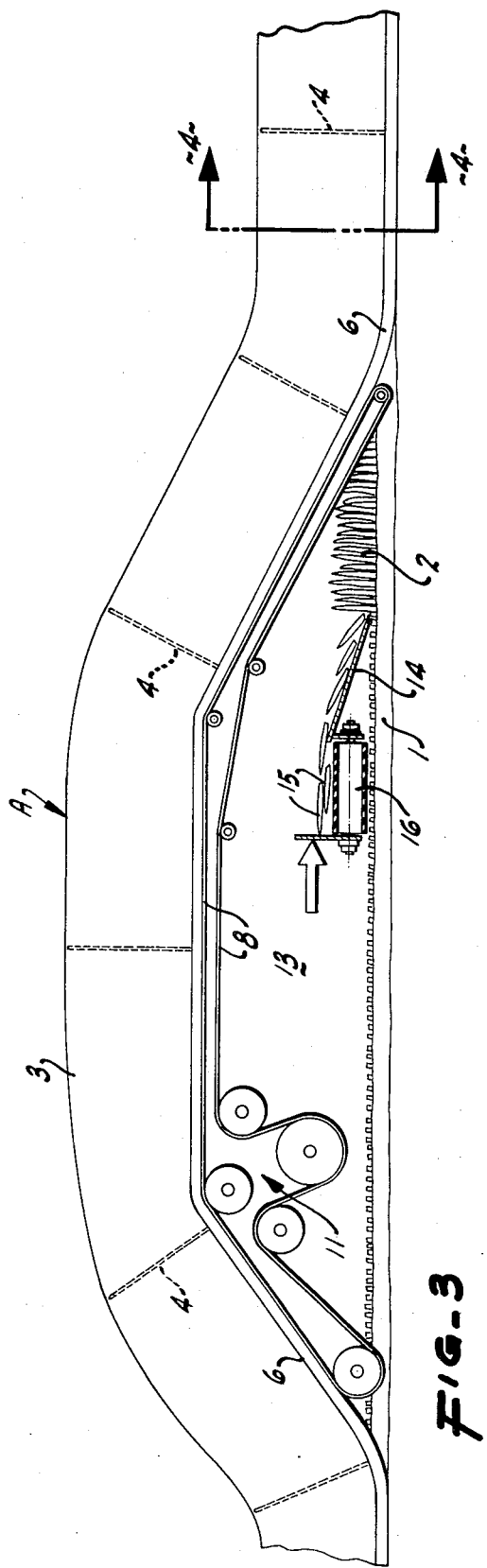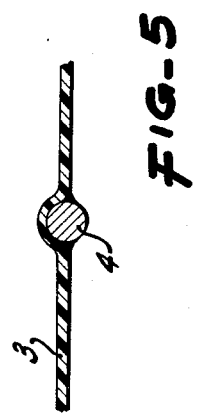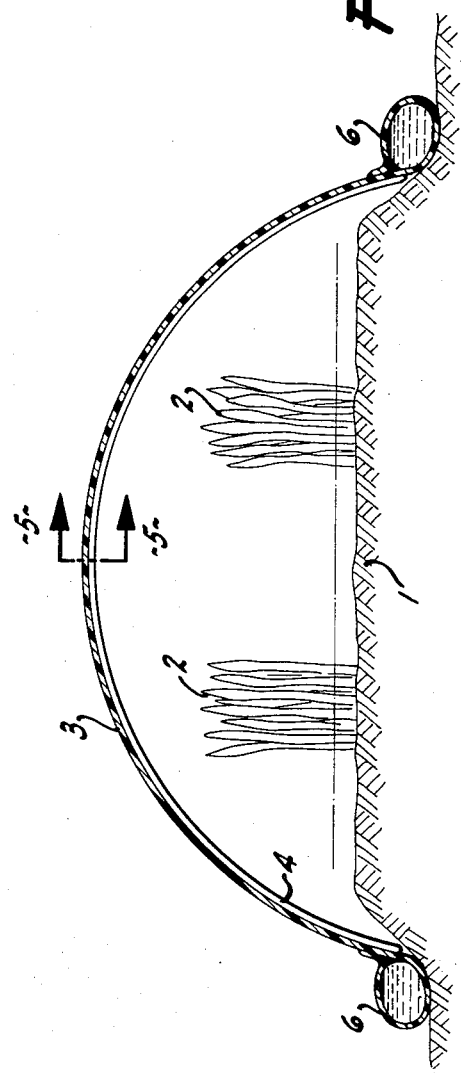

METHOD OF PRODUCING AND HARVESTING WHITE ASPARAGUS SPEARS

BACKGROUND OF THE INVENTION

Heretofore, white asparagus spears have been produced by hilling the soil on the ridged crop row and over the spears as they grow upwardly from the plants in such crop row; the hilled-up soil acting as a blanket to preclude access of sunlight to such spears and prevent them from turning green by reason of photosynthesis. The above practice, while effective, is deemed uneconomical both from the cost of the hilling operation and the subsequent harvest which is conducted by hand with long-handle asparagus knives which must penetrate the hilled-up soil in order to properly sever each stalk a distance below its tip. Further, in order to prevent the tips—which serve as visual "locators" for the spears—from becoming excessively green, the harvest must be undertaken very shortly after such tips emerge above the hilled-up soil, and at which time they are exposed to sunlight. The present invention was conceived with the foregoing as a background and to facilitate the production and harvesting of white asparagus spears while reducing the cost of such operations.

SUMMARY OF THE INVENTION

The present invention provides, as an important object, a novel method of producing white asparagus spears along a ridged crop row wherein the asparagus plants are growing, and from which row the asparagus spears emerge and thereabove grow to harvest maturity; the method including essentially the step of shielding the crop against access of sunlight to said emerging and growing spears whereby, in darkness, they remain white.

The present invention provides, as another important object, a method, as in the preceding paragraph, wherein the row crop is shielded by a longitudinally extending shroud of opaque material; the shroud being movable relative to the crop row to afford access to the spears for harvesting.

The present invention provides, as still another important object, a method, as above, wherein the shroud is formed so that it may be progressively elevated above the crop row—preferably by a machine designed for the purpose and adapted to move along said crop row—to permit of ready and convenient access to, and harvesting of, the white asparagus spears in the zone in which the shroud is so elevated. The method contemplates that the elevation of the shroud will be in the nature of an arch, with the arch, and consequently the zone of access and harvesting, progressing (or travelling) from one end to the other of each crop row; the machine, which produces such elevation of the shroud, carrying the harvesting mechanism.

The present invention provides, as an additional object, a method, as described, which is particularly adapted for practice with a longitudinal shroud which is of flexible material, transversely concave, and maintained in use in such shape by stays spaced along and secured to such shroud; the latter being formed along its longitudinal side edges with flexible tubes filled with a weighting material such as water or sand.

The present invention provides, as a further object, a method of producing and harvesting white asparagus spears which is designed for ease and economy of practice.

The present invention provides, as a still further object, a practical and reliable method of producing and harvesting white asparagus spears, and one which is exceedingly effective for the purpose for which it is designed.

BRIEF DESCRIPTION OF THE DRAWINGS

FIG. 3 is a fragmentary side elevation of the shroud with a portion as elevated, in arch form, to permit of such harvesting of the spears; the view showing, in diagrammatic outline, the driven endless conveyor assembly which progressively elevates the shroud, and the harvesting mechanism in section.

FIG. 4 is an enlarged cross section substantially on line 4—4 of FIG. 3.

FIG. 5 is a fragmentary section substantially on line 5—5 of FIG. 4.

DESCRIPTION OF THE PREFERRED EMBODIMENTS

Figure 1:
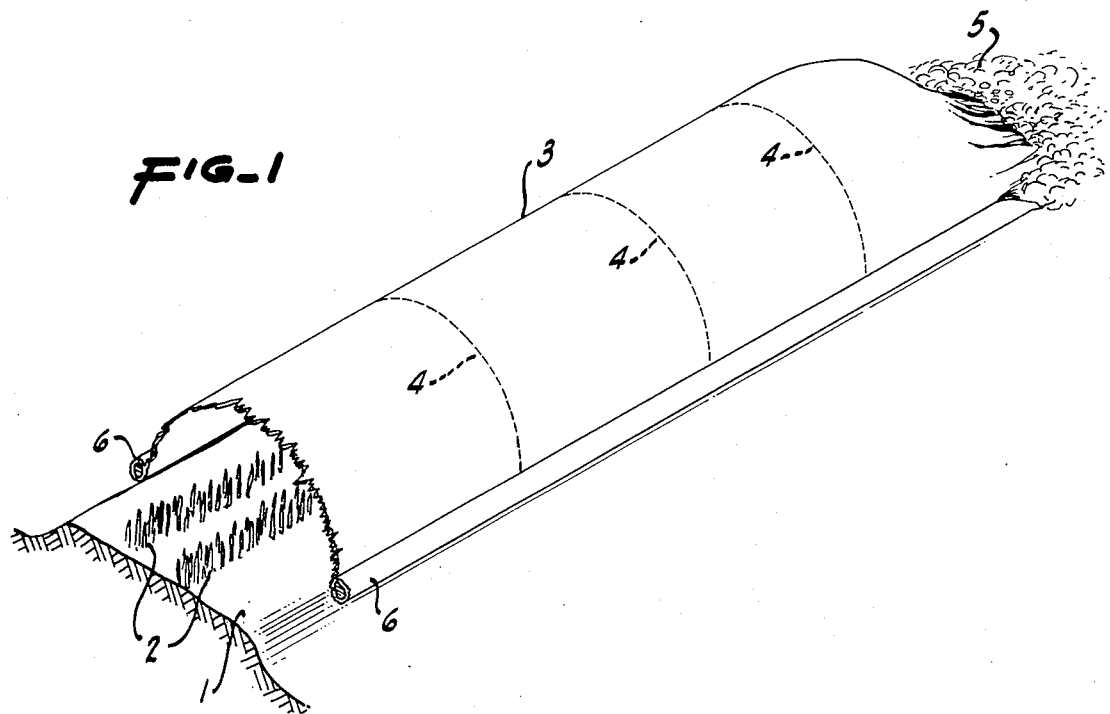
FIG. 1 is a fragmentary perspective view showing one end portion of the shroud in its normal position on a crop row.
Figure 2:
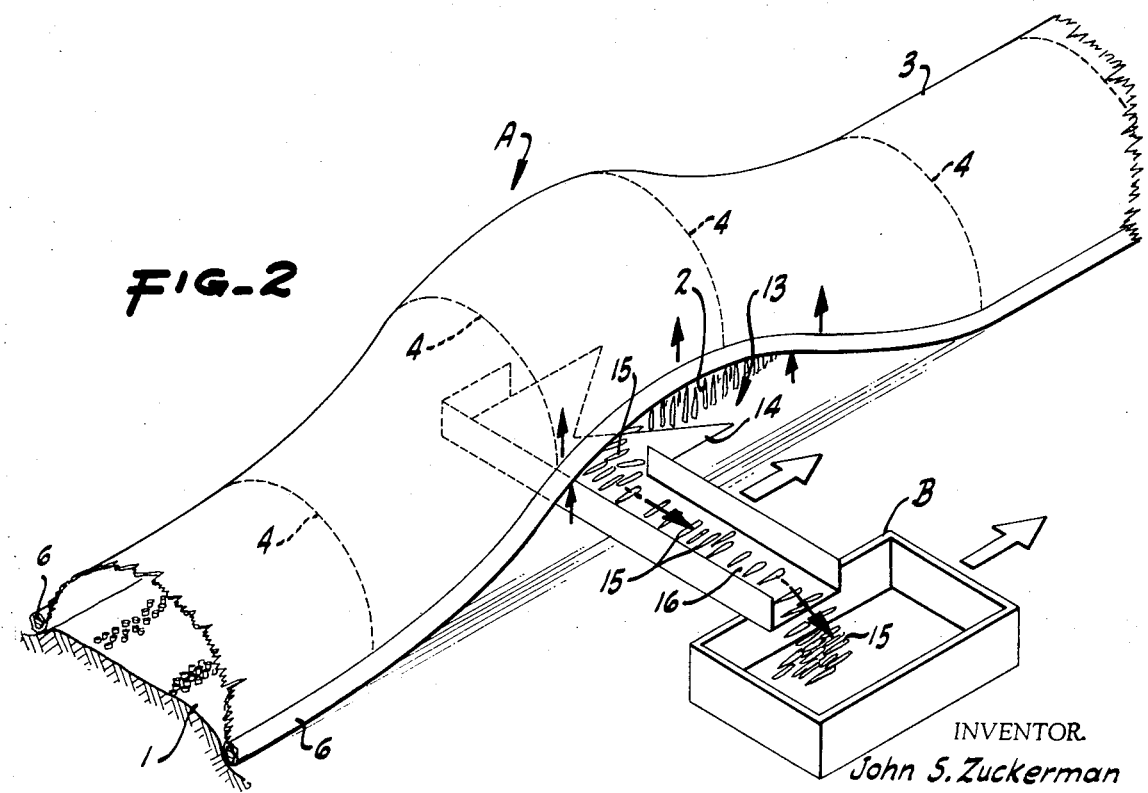
FIG. 2 is a fragmentary perspective view of the shroud with a portion as elevated, in arch form, to permit of harvesting of the spears in the zone of such elevation; the harvesting mechanism being shown in diagrammatic outline.
Figure 6:
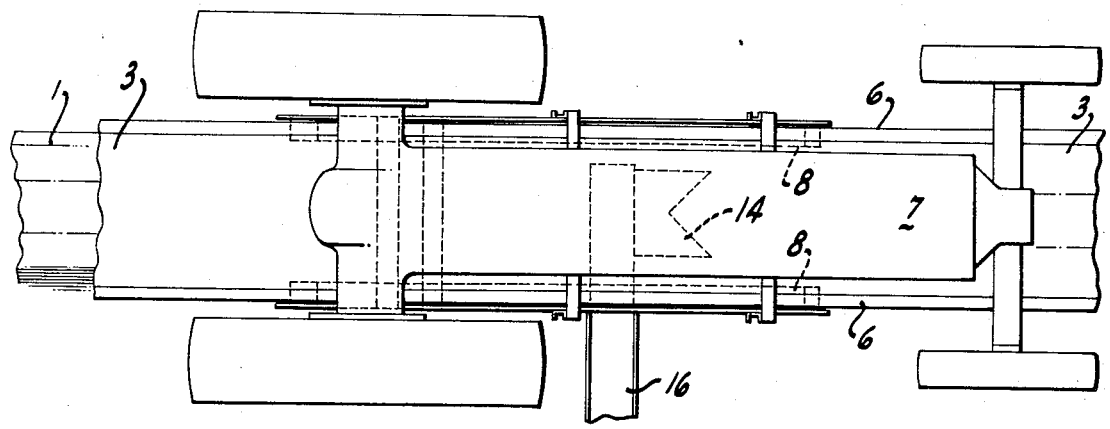
FIG. 6 is a substantially diagrammatic plan view of the machine which progressively elevates the shroud and carries the harvesting mechanism; the view showing the shroud as passing through such machine.
Figure 8:
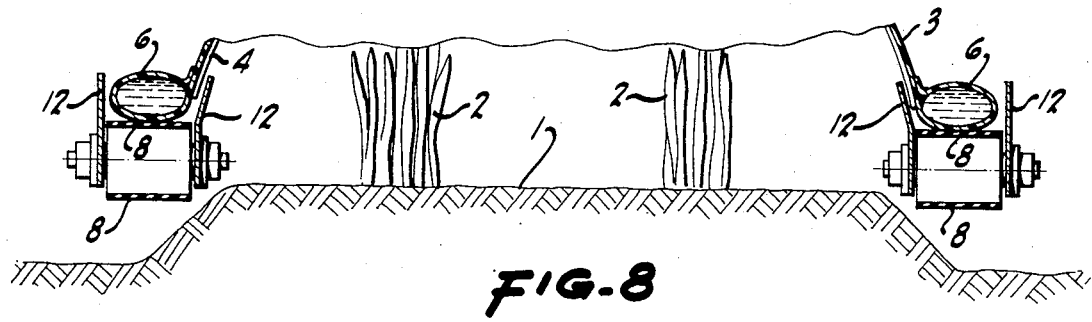
FIG. 8 is an enlarged, fragmentary cross section taken substantially on line 8—8 of FIG. 7.
Figure 7:
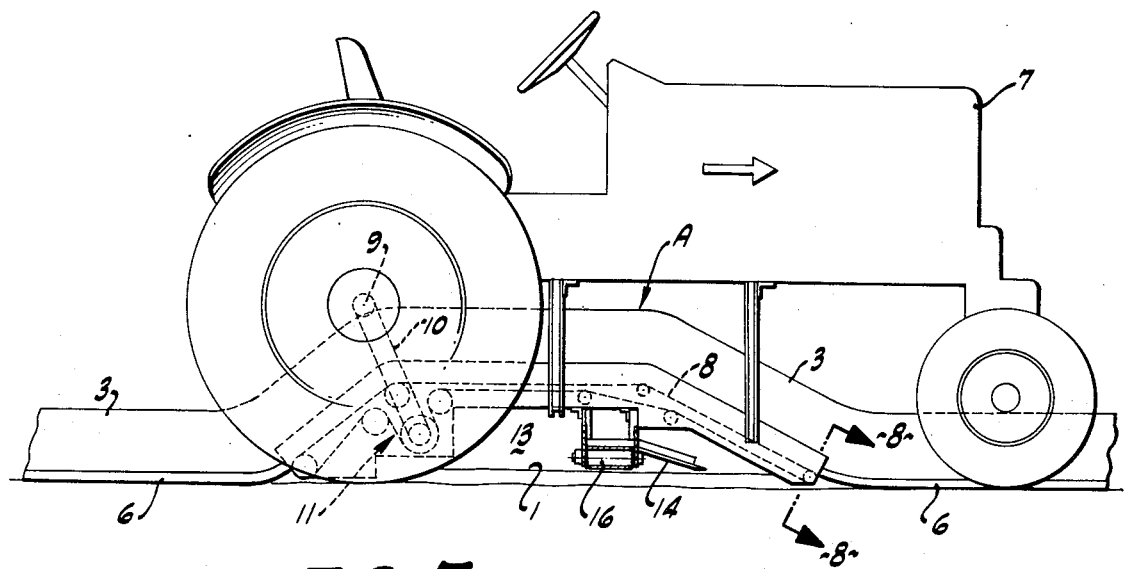
FIG. 7 is a side elevation of the machine as in FIG. 6.

Referring now more particularly to the drawings and to the characters of reference marked thereon, the method of the present invention is practiced in relation to a ridged crop row 1 wherein asparagus plants are growing—usually in two side-by-side, parallel courses—and from which plants asparagus spears 2 emerge from the surface of the crop row and grow upwardly thereabove.

The crop row 1 is normally shielded against access of sunlight to the spears 2 by means of a shroud 3 which covers the crop row from end to end thereof; the shroud, which is of heavy-duty opaque plastic sheet material, being flexible, of inverted trough form, concave in cross section, and maintained in such shape by semi-circular stays 4 secured in the material of the shroud at spaced points in the length of the latter. The shroud 3 extends the full length of the crop row 1, and at its ends the shroud is suitably anchored and closed— as at 5—by a quantity of earth.

The flexible, stay-supported shroud 3, in addition to being anchored at both ends, is normally held in position on the crop row 1 by means of weighted flexible tubes 6 which extend along the side edges of such shroud; the tubes, in order to maintain their flexibility, being filled with water or sand. Not only do the weighted tubes hold the shroud in place, but they also assure of close contact with opposite sides of the crop row as is necessary to prevent entry of sunlight into the shroud.

During the period of emergence from the crop row and growing thereabove to harvest maturity, the asparagus spears 2 —which are white—are sheltered in darkness by the shroud 3. In the absence of sunlight thereon, the spears remain wholly white and do not turn green as would otherwise occur due to photosynthesis.

When the spears 2 reach maturity beneath the shroud 3, such spears are harvested, progressively from one end of the crop row to the other end, in the following manner:

A wheel-type tractor 7 straddles the crop row 1 and the shroud 3 thereon; the tractor being fitted with a pair of longitudinally disposed endless belts 8 roller-supported (as shown) from the tractor in transversely spaced parallel relation; the spacing of the belts being such that they occupy the same longitudinal vertical planes as the corresponding tubes 6 of the shroud. The belts 8 are simultaneously driven from the rear axle 9 of the tractor by endless drives 10 and, through the medium of a roller assembly 11, in a direction such that the upper runs of said belts travel rearwardly at the same speed that the tractor advances.

The belts 8, as roller-supported and carried between side plates 12, have an arched configuration in side elevation, with the front and rear ends of such belts disposed closely adjacent ground level at the corresponding sides of the crop row. Thus, as the tractor 7 advances, with the upper run of belts 8 travelling in a reverse direction, the weighted tubes 6 are engaged from beneath by the front ends of the belts 8, and said tubes—together with the entire shroud—are picked up and are carried rearwardly on such belts through the tractor and with the shroud in an arched configuration, as at A, while remaining longitudinally stationary relative to the ground. As is apparent, such arched configuration of the shroud progresses along the length of the crop row as the tractor travels therealong.

In the laterally open zone 13 defined by such arched configuration, and at which point the crop row 1 and the mature spears 2 are exposed and accessible, the harvesting of such spears is conducted. Such harvesting is accomplished by a cutter unit 14 mounted on the tractor 7 and working very close to the upper surface of the crop row; the spears 15, as severed by the cutter unit 14, being received on a transverse conveyor 16 which extends out from one side of the tractor and discharges into a suitable receiving bin B on a cart or wagon travelling alongside the tractor 7.

As will be apparent, the above-described harvesting operation is conducted progressively along the crop row, as the tractor advances, from end to end thereof; there being no obstruction by the shroud as it is in the arched configuration over the zone in which said harvesting operation occurs.

At the rear of the arched configuration of the shroud, and as it is discharged from the rear ends of the belts 8, the tubes 6 again engage with the earth at opposite sides of the crop row, and said shroud returns to its shielding position over such crop row. The shroud then remains in such shielding position until other spears emerge from the crop row and grow to harvest maturity beneath the shroud—at which time the hereindescribed harvesting operation is repeated.

From the foregoing description it will be readily seen that there has been produced such a method of producing and harvesting white asparagus spears as substantially fulfills the objects of the invention, as recited herein.

While this specification sets forth the present and preferred details of the method, still in practice such deviations from such detail may be resorted to as do not form a departure from the spirit of the invention as claimed.

Having thus described the invention, the following is claimed as new and useful and upon which Letters Patent is desired:

1. A method of producing and harvesting white asparagus spears along a crop row wherein asparagus plants are planted and from which row the asparagus spears emerge and thereabove grow to harvest maturity; the method comprising the steps of applying a movable opaque shroud to the crop row in a form to shield the same against access of sunlight to said emerging and growing spears while at the same time providing a space beneath the shroud to permit such emergence and growing of said spears without substantial obstruction, moving the shroud to expose the crop row and provide access to the spears when at harvest maturity, and then harvesting the spears in the zone of such exposure of the crop row and access to said spears.

2. A method of producing and harvesting white asparagus spears along a crop row wherein asparagus plants are planted and from which row the asparagus spears emerge and thereabove grow to harvest maturity; the method comprising the steps of applying a movable opaque shroud to the crop row in a form to shield the same against access of sunlight to said emerging and growing spears while at the same time providing a space beneath the shroud to permit of such emergence and growing of said spears without substantial obstruction, moving the shroud to expose the crop row and provide access to the spears when at harvest maturity, harvesting the spears in the zone of such exposure of the crop row and access to said spears, and then returning the shroud to its initial position whereby to shield the crop row against access of sunlight to subsequently emerging and growing spears.

3. A method, as in claim 2, in which the steps of moving the shroud, harvesting the mature spears, and returning the shroud, are conducted successively in progression longitudinally of the crop row.

4. A method of producing and harvesting white asparagus spears along a crop row wherein asparagus plants are planted and from which row the asparagus spears emerge and thereabove grow to harvest maturity; the method comprising the steps of applying a movable opaque shroud to the crop row in a form to shield the same against access of sunlight to said emerging and growing spears while at the same time providing a space beneath the shroud to permit of such emergence and growing of said spears without substantial obstruction, moving the shroud to expose the crop row and provide access to the spears when at harvest maturity, and then harvesting the spears in the zone of such exposure of the crop row and access to said spears; the shroud being flexible and applied lengthwise of the crop row, and the step of moving the shroud consisting in longitudinally progressively elevating the shroud to a raised position spaced above the crop row, the harvesting being conducted in the zone in which the shroud is so elevated, and then longitudinally progressively lowering the shroud from said raised position to its initial position whereby to again shield the crop row and prevent access of sunlight to subsequently emerging and growing spears.

5. A method, as in claim 4, in which the harvesting, in said zone, consists of cutting the asparagus spears and conveying the cut spears a distance laterally away from the crop row.

6. A method, as in claim 1, in which the shroud is flexible and applied lengthwise of the crop row, and including the step of providing weighting along the longitudinal edges of said shroud whereby to normally maintain such edges substantially closed with adjacent portions of the crop row.

7. A method of producing and harvesting white asparagus spears along a crop row wherein asparagus plants are planted and from which row the asparagus spears emerge and thereabove grow to harvest maturity; the method comprising the steps of applying a movable opaque shroud to the crop row in a form to shield the same against access of sunlight to said emerging and growing spears while at the same time providing a space beneath the shroud to permit of such emergence and growing of said spears without substantial obstruction, moving the shroud to expose the crop row and provide access to the spears when at harvest maturity, and then harvesting the spears in the zone of such exposure of the crop row and access to said spears; the shroud being flexible and applied lengthwise of the crop row, the method including the step of providing weighting along the longitudinal edges of said shroud whereby to normally maintain such edges substantially closed with adjacent portions of the crop row, and the method further including the step of providing the shroud, at spaced points in its length and between said longitudinal edges, with stays which space the shroud from said emerging and growing spears; the step of moving the shroud consisting of longitudinally progressively elevating the shroud, together with such weighting and stays, to a raised position spaced above the crop row, the harvesting being conducted in the zone in which the shroud is so elevated, and then lowering the shroud from said raised position to its initial position whereby to again shield the crop row and prevent access of sunlight to subsequently emerging and growing spears.

8. A method of producing and harvesting white asparagus spears along a crop row wherein asparagus plants are planted and from which row the asparagus spears emerge and thereabove grow to harvest maturity; the method comprising the steps of applying a movable opaque shroud to the crop row in a form to shield the same against access of sunlight to said emerging and growing spears while at the same time providing a space beneath the shroud to permit of such emergence and growing of said spears without substantial obstruction, moving the shroud to expose the crop row and provide access to the spears when at harvest maturity, and then harvesting the spears in the zone of such exposure of the crop row and access to said spears; the shroud being applied lengthwise of the crop row and formed to permit of arching thereof progressively of its length, and the method including the steps of introducing an elevated structure under the shroud, and advancing such elevated structure along the crop row whereby to arch the shroud progressively of its length; the harvesting of the spears being conducted by a cutting unit and conveying mechanism in the zone of such progressive arching of the shroud, and the shroud returning to its initial position at a point rearwardly of said advancing structure.

9. A method, as in claim 8, in which the elevated structure introduced under the shroud is an endless conveyor assembly of arch form and on the upper run of which the shroud is supported; and including the step of driving such upper run of the endless conveyor assembly at the same speed but contra to the direction of advance.

* * * * *